United States Patent [19]

Thompson

[11] 4,028,257
[45] June 7, 1977

[54] COMPOSITION AND METHOD FOR REDUCING THE SURFACE TENSION OF AQUEOUS FLUIDS

[75] Inventor: James L. Thompson, Tulsa, Okla.

[73] Assignee: The Dow Chemical Company, Midland, Mich.

[22] Filed: Aug. 23, 1976

[21] Appl. No.: 716,508

Related U.S. Application Data

[63] Continuation of Ser. No. 527,577, Nov. 27, 1974, abandoned.

[52] U.S. Cl. .................... 252/8.55 C; 252/8.55 R; 252/355
[51] Int. Cl.² .................. E21B 43/27; E21B 43/26
[58] Field of Search ............... 252/8.55 R, 8.55 C, 252/8.55 D, 8.5 C, 355; 166/307, 308

[56] References Cited

UNITED STATES PATENTS

| | | | |
|---|---|---|---|
| 2,759,019 | 8/1956 | Brown et al. | 252/8.55 X |
| 2,765,851 | 10/1956 | Bond | 252/8.55 X |
| 2,803,306 | 8/1957 | Hower | 252/8.55 X |
| 3,122,204 | 2/1964 | Oakes | 252/8.55 X |
| 3,254,713 | 6/1966 | Scherr et al. | 252/8.55 X |
| 3,711,405 | 1/1973 | Pye et al. | 252/8.55 |
| 3,772,195 | 11/1973 | Francen | 252/355 X |

Primary Examiner—Herbert B. Guynn
Attorney, Agent, or Firm—G. H. Korfhage; Bruce M. Kanuch

[57] ABSTRACT

The functioning of a perfluorinated compound corresponding to the formula

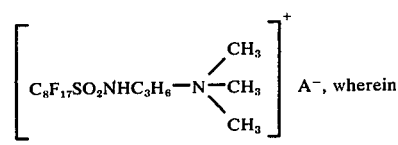

$A^-$ is $Cl^-$, $I^-$, $F^-$ or $Br^-$, preferably $I^-$, to lower the surface tension of various aqueous based liquids (e.g. acids, spend acids, brines, water etc. and corresponding gelled liquids, when such fluids are employed in environments where they come in contact with earthen formations is improved by also incorporating into the liquid a second water wetting surfactant, comprising an adduct of trimethyl-1-heptanol plus seven moles of ethylene oxide.

11 Claims, No Drawings

COMPOSITION AND METHOD FOR REDUCING THE SURFACE TENSION OF AQUEOUS FLUIDS

CROSS-REFERENCE TO RELATED APPLICATION

This is a continuation of application Ser. No. 527,577 filed Nov. 27, 1974, now abandoned.

BACKGROUND OF THE INVENTION

For various reasons it is often desired to lower the surface tension of aqueous liquids. For example, by lowering the surface tension of aqueous liquids, solid matter can be more easily wet by the liquid. This property is useful, for example, when treating subterranean formations with various aqueous liquids to stimulate the flow of petroleum and/or aqueous fluids therefrom. Thus, it is desirable to, for example, employ acidizing, hydraulic fracturing, and other aqueous treatment liquids having low surface tensions.

Low surface tension values in combination with the water wetting properties of an aqueous liquid reduce the capillary forces in the formation being treated. Reduction of the capillary forces in a reservoir results in a more effective recovery of fluids after the formation has been treated. The present invention concerns the discovery of a composition which, when added to an aqueous liquid, effectively reduces the surface tension thereof and also increases the water wetting properties of the liquid.

Various quaternized perfluoroalkane-sulfonamidopolymethylenealkylamine compounds are known to reduce the surface tension of neutral, acidic and basic aqueous solutions even when present in minute amounts (see U.S. Pat. No. 2,759,019). However, these compounds were found to become ineffective when the aqueous solution in which they were employed came into contact with earthen formations. Thus, the use of such compounds in liquids employed to treat, for example, subterranean formations is limited. The present invention concerns the discovery of how to effectively make use of the surface active properties of such compounds in these types of liquids.

SUMMARY OF THE INVENTION

The invention comprises an aqueous composition, a method of reducing the surface tension of aqueous liquids and a method for treating subterranean formations to stimulate the flow of fluids therethrough.

The composition comprises an aqueous liquid containing an effective amount of a compound of the formula

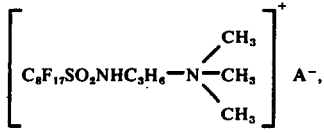

wherein $A^-$ is a halide and also another surfactant comprising an adduct of trimethyl-1-heptanol plus seven moles of ethylene oxide.

DETAILED DESCRIPTION OF THE INVENTION

The other surfactant and the perfluorinated compound are combined in a weight ratio (other surfactant: perfluorinated compound) ranging from about 1:1 to about 40:1.

The aqueous liquids comprise acidic, neutral and alkaline solutions and can be gelled, contain noninterfering functional additives such as, corrosion inhibitors freeze point depressants, weighing agents, proppants, alcohols, and the like.

The combination of the perfluorinated compound and the other surfactant are employed in a combined amount ranging from about 0.005 to about 0.1 per cent by weight of an aqueous liquid. The exact amount will depend on the particular aqueous liquid they are dispersed in. For example, in concentrated acid solutions, e.g., HCl, HF and the like, the combination of materials are employed in an amount ranging from about 0.05 to about 0.1 per cent by weight of the aqueous acid solution. In brines, the combination of compounds is employed in an amount ranging from about 0.005 to about 0.05 per cent by weight of the brine.

The aqueous liquids containing the combination of surfactants can be employed in many uses wherein low surface tension properties are desired, e.g., matrix acidizing, water-base fracturing, fracture-acidizing and emulsified acids employed in acidizing fracturing techniques. Such liquids are particularly useful for treating subterranean formations to perfect or make more efficient the recovery of fluids, e.g., petroleum fluids (oil and gas), water, other gases etc., therefrom.

In one particular utility, the efficiency of an acidizing solution is greatly increased by incorporating therein the mixture of the perfluorinated compound and the second surfactant. For example, in acidizing with HCl solutions, the surface tension of the resulting solution can be drastically reduced by employing therein from about 0.05 to about 0.1 per cent by weight of the combination of surfactants previously identified. The acidizing solution is then used in standard acidizing procedures, i.e., it can be used in standard matrix acidizing process, in acidizing-fracturing processes, and the like. It has been found that such acidizing solutions penetrate the formation more easily, thereby effecting a greater stimulation of the production of fluids. Also, such solutions are more easily removed from the formation following the acidizing treatment. Moreover, the particular adduct employed herein does not significantly detrimentally affect the initial surface tension reducing properties of the perfluorinated compound, as do many other surfactants when employed in combination with the perfluorinated compounds.

It has been also discovered that the aqueous solution is quite effective for acidizing gas producing formations. The use of aqueous liquids to treat gas producing formations has produced particular difficulties because aqueous liquids tend to block the intricacies of the formation to the flow of gases. Thus, in many instances, such solutions have hindered instead of stimulated the flow of gas from the formation. When fracturing a gas producing formation, it has been the practice to employ nonaqueous fracturing fluids such as oils, $CO_2$-methanol mixtures and the like. However, because aqueous liquids can be considerably less expensive and also are generally more available than other such fluids, it is desired to use aqueous liquids if possible. The present discovery now permits such use.

The individual surfactants can be blended directly into an aqueous treatment liquid or they can be premixed and easily blended into a treatment liquid employing standard equipment employed in fracturing and acidizing treatments. The premix may also contain water, mono and/or polyhydric alcohols, and other functional additives.

One such preblend comprises a blend containing as parts by weight, 2916 parts H$_2$O; 3185 parts isopropyl alcohol; 1535 parts of a 60 per cent by weight aqueous solution of an adduct of trimethyl-1-heptanol plus seven moles of ethylene oxide and 134 parts of the above identified perfluorinated compound wherein A$^-$ is iodide.

The above defined blend is employed in an amount ranging from about 2 to about 4 gallons per 1000 gallons of an acid, e.g. hydrochloric acid (3 to 28 per cent strength), hydrochloric-hydrofluoric acid mixtures, aqueous fracturing fluids and other aqueous fluids to lower the surface tension thereof. Higher concentrations are recommended for matrix acidizing treatments while lower concentrations can be employed in fracturing treatments.

As indicated the aqueous liquids in which the combination of surfactants can be successfully employed can contain other functional additives such as thickening and gelling agents, weighing agents, corrosion inhibitors and the like. The compatibility of the combination of surfactants with other functional additives should be ascertained prior to preparing large quantities of such aqueous liquids.

A preblend was prepared containing as parts by weight: 2916 parts H$_2$O; 3185 parts isopropyl alcohol; 1535 parts of an adduct of tri-methyl-1-heptanol plus seven moles of ethylene oxide; and 40 parts of the iodide salt of the previously defined perfluorinated compound. Aqueous mixtures were prepared containing 2 gallons of the preblend with 1000 gallons of various liquids. The surface tension of the mixtures was determined employing a Dunouy Tensiometer. The liquids employed, their original surface tensions and the resulting surface tension are set forth in the following Table.

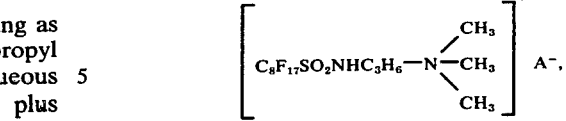

wherein A$^-$ is Cl$^-$, F$^-$, I$^-$, or Br$^-$, and another surfactant consisting of an adduct of trimethyl-1-heptanol plus seven moles of ethylene oxide, said surfactants being present in an other surfactant:perfluorinated surfactant weigh ratio of from about 1:1 to about 40:1, and the total amount of said perfluorinated surfactant and said surfactant in said aqueous liquid ranging from about 0.005 to about 0.1 per cent by weight of said composition.

2. The composition of claim 1 wherein said aqueous liquid is acidic.

3. The composition of claim 2 wherein the aqueous liquid is an aqueous HCl solution.

4. The composition of claim 1 wherein the composition is gelled.

5. The composition of claim 1 including an alcohol.

6. In the method of stimulating the flow of a fluid from a subterranean formation wherein a portion of the formation is solubilized with an aqueous acid solution, the improvement which comprises:
   injecting into said formation the composition of claim 1 wherein said aqueous liquid is an acid in which at least a portion of said subterranean formation is soluble.

7. The method of claim 6 wherein the aqueous liquid is an aqueous solution of HCl.

8. In the method of stimulating the flow of a fluid from a subterranean formation wherein the formation is fractured by introducing an aqueous fracturing fluid through a borehole and into contact with said formation under sufficient pressure to fracture the formation,

TABLE

| Test No.*** | Liquid | Final Surface Tension Dynes/cm. | Original Surface Tension Dynes/cm. |
|---|---|---|---|
| 1 | 3 HCl* | 18.0 | 32.1 |
| 2 | 7.5 HCl | 17.9 | 31.3 |
| 3 | 15 HCl | 17.5 | 30.2 |
| 4 | 28 HCl | 18.3 | 30.1 |
| 5 | 12-3 HCl-HF | 18.2 | 31.5 |
| 6 | Spent 3 HCl** | 18.2 | 36.2 |
| 7 | Spent 15 HCl** | 24.2 | 34.5 |
| 8 | H$_2$O | 21.2 | 72.0 |
| 9 | Brine*** | 22.0 | 74.3 |

*The number indicates strength of acid in weight percent. All the acids contained about a .52 percent by weight of a corrosion inhibitor of the type disclosed in U.S. Pat. No. 3,634,270
**Spent acid was prepared by reacting the live acid with a sufficient quantity of CaCO$_3$ to neutralize the acid.
***The brine was an aqueous solution containing 8 percent by weight of sodium chloride and 2.5 percent of calcium chloride.

the improvement which comprises: employing as the fracturing fluid the composition of claim 1.

9. The method of claim 8 wherein the aqueous liquid of said fracturing fluid is an aqueous acid solution in which at least a portion of the formation is soluble.

What is claimed is:

1. An aqueous composition suitable for use in treating subterranean formations comprising:
   A. An aqueous liquid, and
   B. dispersed in said aqueous liquid a perfluorinated surfactant of the formula 10. The method of claim 9 wherein the aqueous liquid is aqueous HCl.

11. The method of claim 9 wherein the flow of fluid to be stimulated is petroleum gas.

* * * * *